United States Patent [19]

Debique et al.

[11] Patent Number: 5,613,079
[45] Date of Patent: Mar. 18, 1997

[54] SYSTEM FOR VERIFYING THE PROPER OPERATION OF A REPLICATION FACILITY

[75] Inventors: Kirt Debique; Balan S. Raman, both of Redmond, Wash.

[73] Assignee: Microsoft Corporation, Redmond, Wash.

[21] Appl. No.: 524,000

[22] Filed: Sep. 5, 1995

Related U.S. Application Data

[63] Continuation of Ser. No. 230,324, Apr. 20, 1994, abandoned.

[51] Int. Cl.$^6$ .................................................. G06F 11/00
[52] U.S. Cl. .............. 395/468; 395/183.14; 364/DIG. 1; 364/DIG. 2
[58] Field of Search .................... 395/600, 468, 395/375, 183.14; 364/551.01

[56] References Cited

U.S. PATENT DOCUMENTS

| | | | |
|---|---|---|---|
| 4,432,057 | 2/1984 | Daniell et al. | 364/300 |
| 4,620,276 | 10/1986 | Daniell et al. | 395/375 |
| 4,714,992 | 12/1987 | Gladney et al. | 395/375 |
| 4,714,996 | 12/1987 | Gladney et al. | 364/300 |
| 5,161,115 | 11/1992 | Teshima et al. | 364/551.01 |
| 5,214,776 | 5/1993 | Bagnoli et al. | 395/425 |
| 5,247,673 | 9/1993 | Costa et al. | 395/650 |
| 5,261,094 | 11/1993 | Everson et al. | 395/600 |
| 5,274,789 | 12/1993 | Costa et al. | 395/425 |
| 5,333,265 | 7/1994 | Orimo et al. | 395/200 |
| 5,355,471 | 10/1994 | Weight | 395/575 |
| 5,434,994 | 7/1995 | Shaheen et al. | 395/500 |
| 5,440,727 | 8/1995 | Bhide et al. | 395/444 |
| 5,452,448 | 9/1995 | Sakuraba et al. | 395/600 |
| 5,493,728 | 2/1996 | Solton et al. | 395/250 |
| 5,513,314 | 4/1996 | Kandassmy et al. | 395/182.04 |

OTHER PUBLICATIONS

Novell, Netware Version 3.11, Utilities References by Norell Inc. Netware pp. 267–271.

Log Based directory Resolution in the coda file system by Kumar et al, IEEE Feb. 1993 publication pp. 202–213.

Updating software and configuration data in a distributed communications network by Carl W. Symborski, 1988 IEEE pp. 331 to 338.

Coda:A highly available file system for a distributed workstation environment by Satyanarayanan et al, IEEE 1990 pp. 447–459.

Managing networked workstations by Hickerson et al. IEEE Spectrum, Apr. 1992, pp. 55–58.

*Primary Examiner*—William M. Treat
*Assistant Examiner*—Zarni Maung
*Attorney, Agent, or Firm*—Seed and Berry LLP

[57] ABSTRACT

A verification strategy is provided to verify proper multi-master replication of logical structures, such as objects, in a data processing system. The strategy is especially well adapted for use within the distributed environment. The strategy verifies that proper reconciliation of name spaces has occurred via multi-master replication. The strategy also verifies that the correct propagation of knowledge of changes to objects has occurred during replication.

27 Claims, 11 Drawing Sheets

SYSTEM FOR VERIFYING THE PROPER OPERATION OF A REPLICATION FACILITY

CROSS-REFERENCE TO RELATED APPLICATION

This application is a continuation of U.S. patent application No. 08/230,324, filed Apr. 20, 1994, now abandoned.

DESCRIPTION

TECHNICAL FIELD

The present invention relates generally to data processing systems and, more particularly, to the verification of replication of logical structures, such as objects, within a distributed environment.

BACKGROUND OF THE INVENTION

Replication facilities are provided in a number of different types of conventional software products. For instance, replication facilities are incorporated in database products, groupware products and network directory service products. One difficulty with such conventional replication facilities is that there has been no software for testing whether the replication facility operates properly once it has been installed.

SUMMARY OF THE INVENTION

The above described difficulty with conventional replication facilities in the prior art is overcome by the present invention. In accordance with one aspect of the present invention, a method for verifying proper multi-master replication of logical structures is performed in a data processing system. The data processing system has a storage for storing logical structures and a replication facility for replicating the logical structures. In accordance with this method, changes are made to selected ones of the logical structures at a first location in the data processing system. Information about the changes is logged into a log. Subsequently, the selected logical structures are replicated to a second location in the data processing system. The changes to the selected logical structures are then verified to ensure that the changes were probably replicated to the second location.

In accordance with another aspect of the present invention, a method for verifying proper multi-master replication of objects is performed in a distributed system. The distributed system has a replication facility and storage devices for storing objects. In accordance with this method, a local replica has a set of objects to be replicated. At least one change is made to an object in the local replica, and information about the change is stored in the storage devices. The local replica is replicated with a remote replica (having a corresponding set of objects) to make the remote replica reflect the change made at the local replica. The replication is then verified to ensure that the local replica was properly replicated.

In accordance with a further aspect of the present invention, a data processing system includes a local set of logical structures and a remote set of logical structures. The data processing system also includes a multi-master replication facility for replicating structures. The replication facility includes a last writer wins reconciler for reconciling sets of logical structures so that the sets of logical structures are substantially identical. The data processing system further includes a replication verifier for verifying that the replication facility operates properly. The data processing system may be a distributed system.

DETAILED DESCRIPTION OF THE INVENTION

A preferred embodiment of the present invention provides a verification strategy for verifying that the proper reconciliation of object name spaces has occurred, and it verifies that the correct propagation of knowledge about changes to objects has occurred during multi-master replication. The preferred embodiment of the present invention is incorporated into a testing tool that may be run after a multi-master replication facility has been installed in a distributed environment to verify that the replication facility operates correctly.

Figure 1:
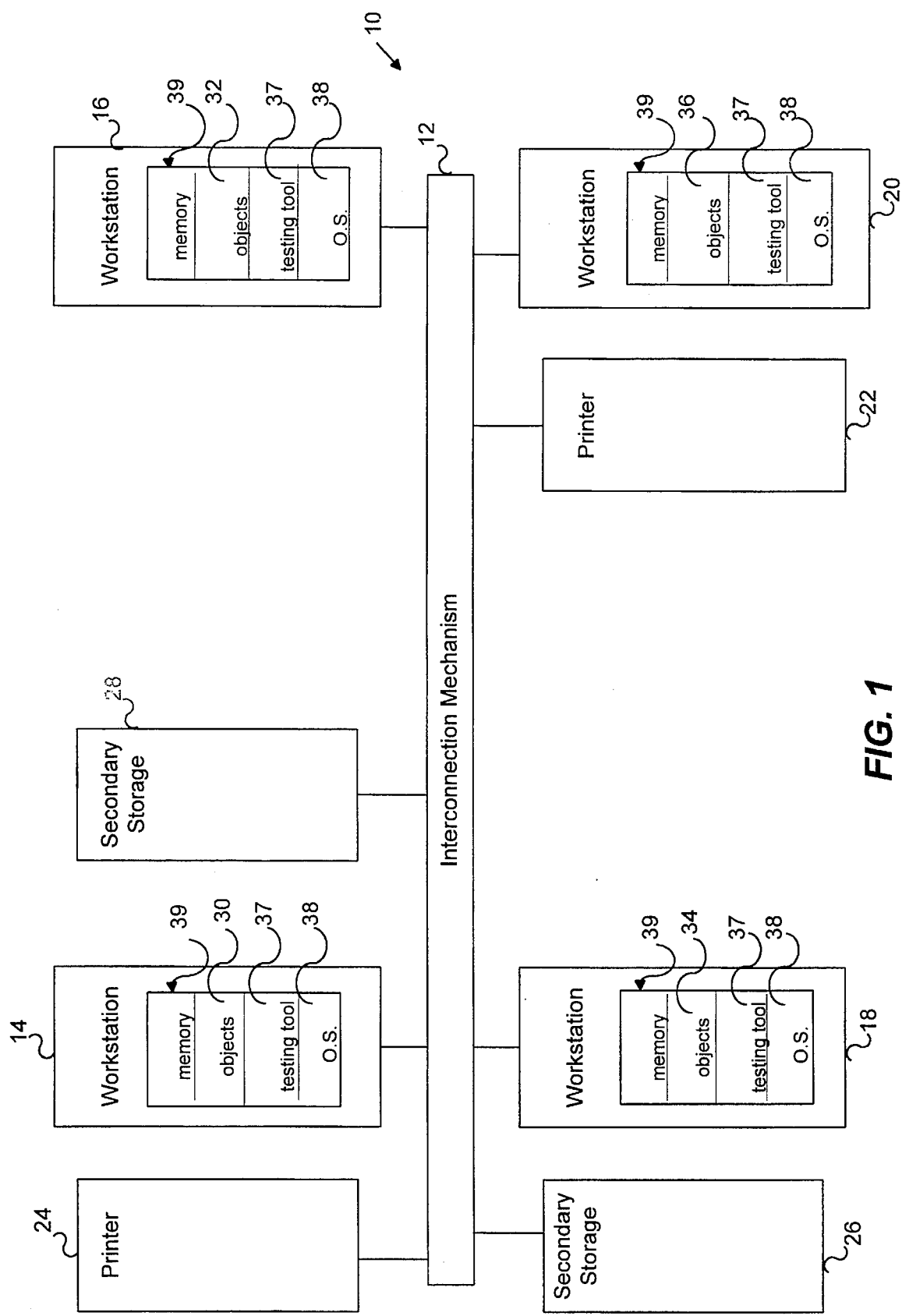
FIG. 1 is a block diagram of a distributed system that is suitable for practicing a preferred embodiment of the present invention.

FIG. 1 depicts a distributed system 10 that is suitable for practicing the preferred embodiment of the present invention. The distributed system 10 includes an interconnection mechanism 12, such as a local area network (LAN), wide area network (WAN), or other interconnection mechanism, that interconnects a number of different data processing resources. The data processing resources include workstations 14, 16, 18 and 20, printers 22 and 24 and secondary storage devices 26 and 28. Each of the workstations 14, 16, 18 and 20 includes a respective memory 30, 32, 34 and 36. Each of the memories 30, 32, 34 and 36 holds a copy of a distributed operating system 38. The distributed operating system 38 provides a file service and a directory service for the distributed system 10. Each memory also holds a copy of the testing tool 37 that is used to practice the preferred embodiment of the present invention. In addition, each memory 30, 32, 34 and 36 holds a number of objects 39 that may be subject to replication. These objects are named and are part of a distributed name space that is provided by the directory service of the distributed operating system.

Those skilled in the art will appreciate that the present invention may be practiced on other configurations that differ from the configuration shown as FIG. 1. The distributed system 10 shown in FIG. 1 is intended to be merely illustrative and not limiting of the present invention. For example, the interconnection mechanism 12 may interconnect a number of networks that are running separate network operating systems, rather than interconnecting workstations and other data processing components, as shown in FIG. 1.

The preferred embodiment of the present invention is adapted to verify multi-master replication of persistent "objects". An object, in its context, is a logical structure that holds at least one data field. An object may also include one or more functions. Although the preferred embodiment of the present invention employs objects, those skilled in the art will appreciate that the present invention is not limited to an object-oriented environment; that, the present invention may also be practiced in non-object-oriented environments. The present invention is not intended to be limited to verification of replication involving objects; rather, it is intended to provide verification of multi-master replication of different types of logical structures, including files and/or file directories.

The distributed operating system 38 provides a multi-master replication facility that duplicates objects so that the objects may be distributed across the distributed system. In addition, the replication facility also provides for reconciliation of multiple copies of objects. This reconciliation refers to reconciling an object with a changed object so that the object reflects the changes made to the changed object. For instance, suppose that a remote copy of an object has been changed and a local copy of the object has not yet been updated to reflect the change. Reconciliation involves reconciling the two copies of the objects such that the local copy of the object is changed in a like fashion to how the remote copy of the object was changed. Creation of an object may also be viewed as a change that is reconciled by reconciliation. Thus, the duplication performed by the replication facility is a form of reconciliation.

An "object set" is a logically grouped set of objects. A replica is an entry which represents a copy of a particular object set that is targeted for replication. A "replica set" is a group of replicas wishing to be replicated with one another in a particular topology in accordance with a set of policies.

The testing tools 37 that implement the verification of the preferred embodiment of the present invention include code for implementing changes on objects and for maintaining a log of information when the changes are implemented during testing. The testing tools 37 include a change object for applying changes to objects in the object set and a configuration object for specifying the changes to be applied by the change object. The log is maintained so that the data contained therein may be later used to verify proper replication, as will be described in more detail below. The changes include name space changes as well as content changes. In general, the changes that may be performed by the testing tool 37 include create object, delete object, modify object, rename object, move object, lock object and unlock object. Create object involves creating a new object that is placed into the distributed name space. Delete object involves removing an object from the distributed name space. Modify object involves updating a file system mechanism, such as a timestamp, to reflect that the contents of the object have changed. Rename object involves changing the name of the object in the distributed name space. Move object involves changing the location of the object within the distributed name space. Lock object involves locking other entities from accessing the object while locked, and unlock object involves removing the lock that is set by lock object.

As was mentioned above, the verification algorithm of the preferred embodiment of the present invention verifies that the name space of an object set has been correctly reconciled amongst two replicas (i.e., it verifies that both replicas have the same named objects). In addition, the verification algorithm verifies that correct propagation of knowledge of changes has occurred amongst replicas in a particular replica set (i.e., it verifies that changes at one replica are known to the other replica).

Before the verification algorithm of the preferred embodiment of the present invention is run, several conditions must be met. These conditions must be met to insure that verification is performed properly. The conditions are: First, local changes at the source replica (i.e., the replica whose changes are being replicated) and destination replica (i.e., the replica who is receiving the changes from the source replica) have halted. Second, the last propagation of changes from the source replica to the destination replica is later than the last propagation of changes from the destination replica to the source replica. Third, the time of the last propagation of changes from the destination replica to the source replica is later than the time of the last propagation of changes from any other source to the destination replica. Fourth, the previous three conditions must be guaranteed for the duration of the verification. These conditions must be met to ensure proper verification in the preferred embodiment of the present invention. Nevertheless, those skilled in the art will appreciate that these are not intended to be limitations to the present invention.

Figure 2:
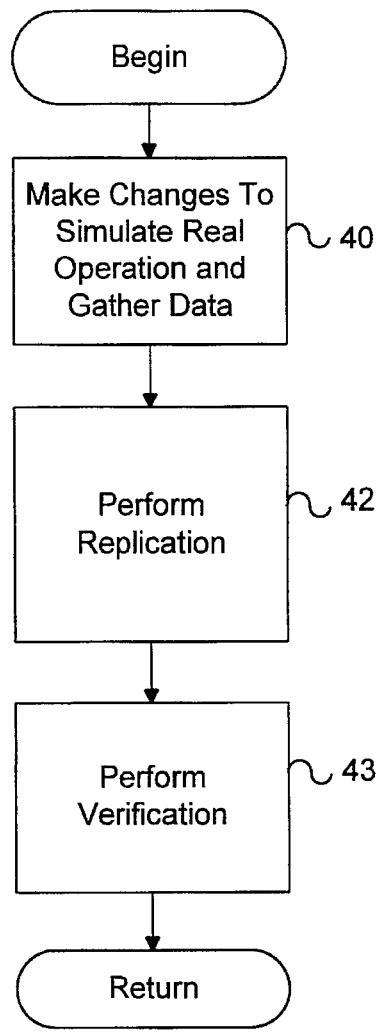
FIG. 2 is a flowchart illustrating the steps performed by the testing tools of the preferred embodiment of the present invention.

The verification algorithm of the preferred embodiment of the present invention operates on a pair wise basis between a first replica and a second replica within the distributed system 10. The algorithm may be applied to each pair of replicas within a replication topology of the distributed system to verify that all possible paths of replication have been tested. The present invention is not concerned with how such replication topologies are defined or created; rather, the present invention assumes such topologies have been defined and such topologies may be made known to the testing tool 37. For each replica pair, the steps shown in FIG. 2 are performed. In particular, changes, such as create object, modify object, delete object, rename object, move object, lock object or unlock object performed on objects within an object set as directed by the testing tool 37. These changes are made to ensure that the replication facility will properly replicate the changes. Data is gathered as the changes are performed (step 40 in FIG. 2). As mentioned above, this data is gathered for later examination to verify that replication occurred properly. Replication of the object set at the source replica is then performed relative to a destination replica using the replication facility that is provided by the operating system 38 (step 42). A suitable replication facility is described in co-pending application, entitled "REPLICATION FACILITY", Ser. No. 08/181,704, which is assigned to a common assignee with the present application. Later, when the previously described conditions exist and replication is complete, verification is performed (step 43). The verification identifies any objects for which replication errors arose.

Figure 3:
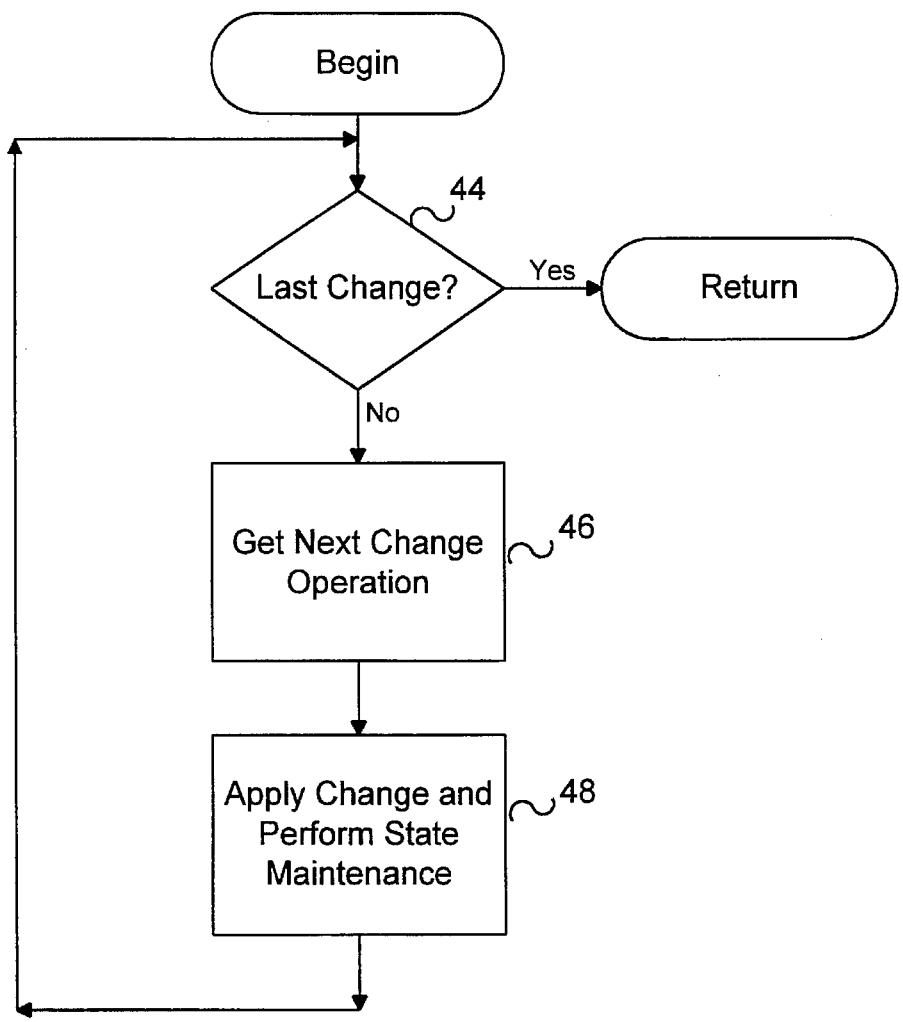
FIG. 3 is a flowchart illustrating step 40 of FIG. 2 in more detail.

FIG. 3 shows the sub-steps performed as part of step 40 of FIG. 2 of making changes and gathering data. Specifically, a number of changes, as specified by the testing tool, are made and "state maintenance" operations are performed to record the state at the time of the change. The types of data that are recorded as part of state maintenance will be described in more detail below. In step 44, the testing tool determines whether any additional changes remain to be performed. The testing tool is configurable to apply a number of different changes. In this regard, the testing tool 37 contains a list of change operations. The list of change operations specifies the number of operations to be performed and the type of operations to be performed. The changes are applied to random objects within the object set to be replicated. If additional changes remain to be performed, the next change operation is obtained from the testing tool (step 46). State maintenance is then performed for the obtained change operation (step 48). This process is repeated until all of the change operations listed in the testing tool have been performed.

Figure 4A:
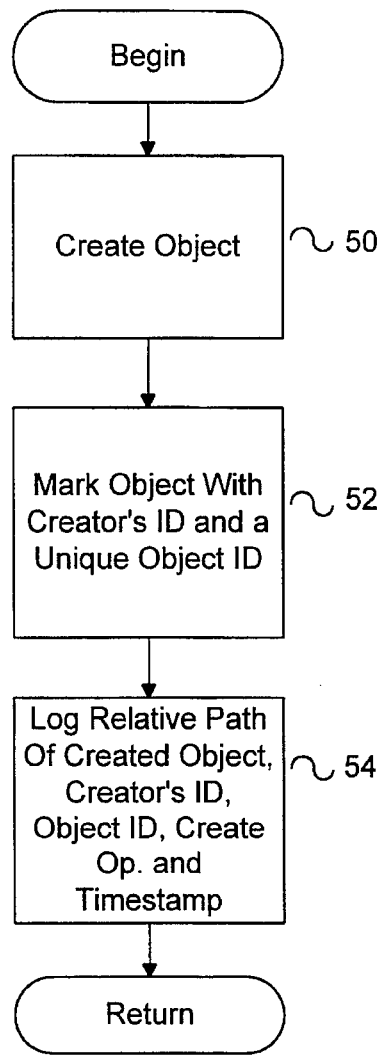
FIG. 4A is a flowchart illustrating in more detail the steps performed as part of step 48 of FIG. 3 when the change operation is a creation operation.

The steps that are performed as part of state maintenance (step 48, FIG. 3) depends upon the change operation that is being applied. FIG. 4A is a flow chart illustrating the steps performed when the change operation is a create object operation. In step 50, a new object is created as directed by the create object operation. The object is marked with an identifier (ID) that uniquely identifies the object and is also marked with the ID of the creator object (i.e., the change object) that requested creation of the new object (step 52). In addition, a change operation entry is made into a log that is maintained during testing. The relative path name of the created object within the distributed name space is entered into the log along with the identifier of the creator object, the ID of the created object, an indication that a create object operation has occurred and a timestamp (step 54).

Figure 4B:
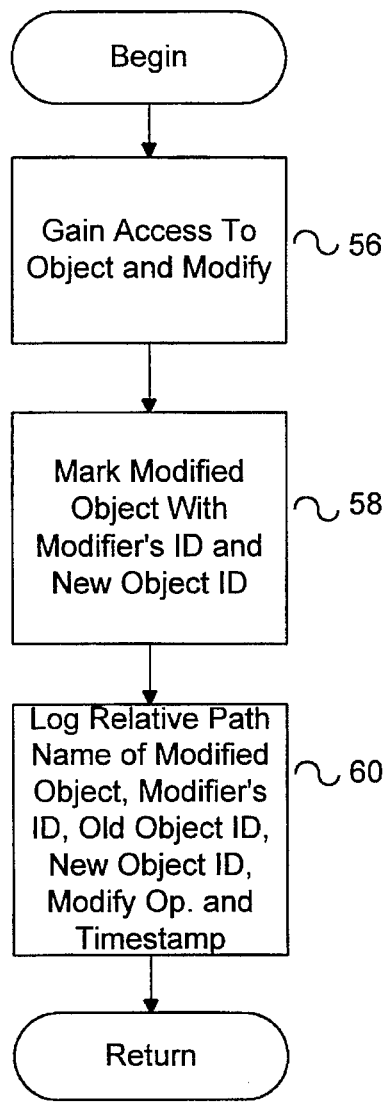
FIG. 4B is a flowchart illustrating in more detail the steps performed as part of step 48 of FIG. 3 when the change operation is a modification operation.

FIG. 4B shows a flow chart of the steps performed when the change operation being applied is a modify operation. Access is gained to the object and the desired modification is performed (step 56). The modification may involve numerous things, such as changing data held in the object. The object that has been modified is marked with the modifier object's ID (i.e., the ID of the change object) and a new object ID (step 58). A modify operation log entry is made for this change (step 60). The log entry includes an indication that a modify operation has occurred, a relative path name in the distributed name space for the modified object, the ID of the modifier object, the old object ID of the modified object, the new object ID of the modified object and a timestamp.

Figure 4C:
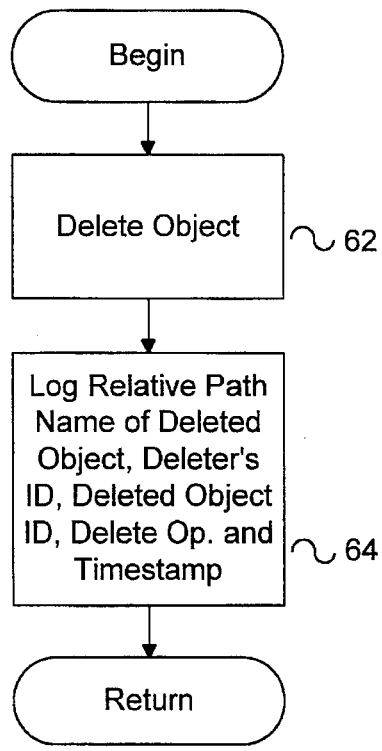
FIG. 4C is a flowchart illustrating in more detail the steps performed as part of step 48 of FIG. 3 when the change operation is a deletion operation.

FIG. 4C is a flow chart of the steps that are performed when the change operation being applied is a delete object operation. First, the object is deleted so that it is no longer visible in the distributed name space (step 62). A log entry is made that includes the relative path name of the deleted object in the distributed name space, the ID of the deleter object (i.e., the ID of the change object), the object ID of the deleted object, an indication that a delete operation has occurred and a timestamp (step 64).

Figure 4D:
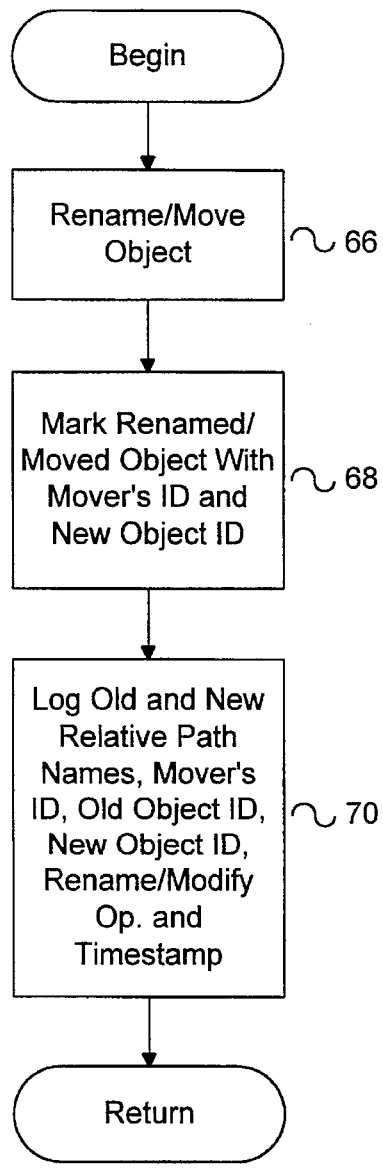
FIG. 4D is a flowchart illustrating in more detail the steps performed as part of step 48 of FIG. 3 when the change operation is a rename operation or a move operation.

FIG. 4D is a flow chart of the steps performed when the operation is a rename object operation or a move object operation. The identified object is renamed or moved as specified by the operation (step 66). The renamed or moved object is marked with the mover object's ID (i.e., the ID of the change object) and a new object ID (step 68). The old and new relative path names to the moved/renamed object are entered into the log as a log entry. The log entry also includes the ID of the renamed/moved object, the old ID of the renamed/moved object, the new ID of the renamed/moved object and a timestamp (step 70).

Figure 4E:
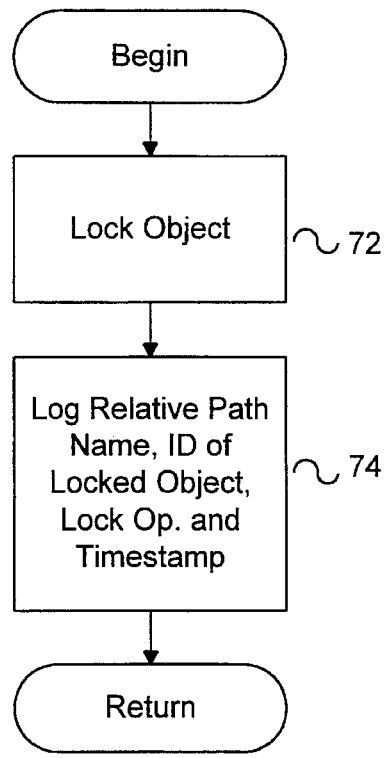
FIG. 4E is a flowchart illustrating in more detail the steps performed as part of step 48 of FIG. 3 when the change operation is a lock operation.

FIG. 4E is a flowchart of the steps performed when the operation is a lock operation. The identified object is locked (step 72). The relative path name of the object, the ID of the lock object, an indicator that a lock operation has been performed and a timestamp are entered into the log (step 74).

Figure 4F:
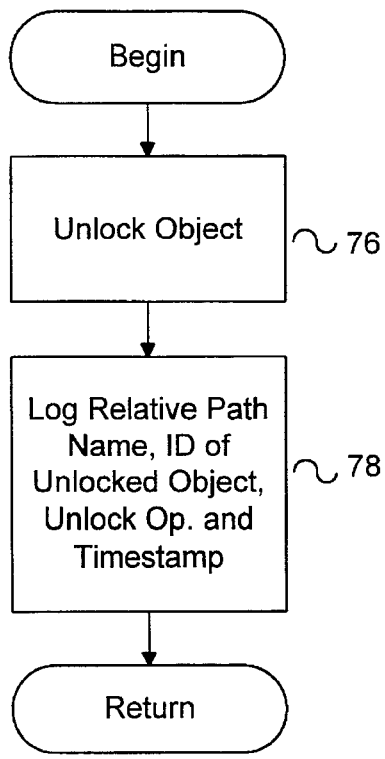
FIG. 4F is a flowchart illustrating in more detail the steps performed as part of step 48 of FIG. 3 when the change operation is an unlock operation.

FIG. 4F is a flowchart of the steps performed when the operation is an unlock operation. The identified object is unlocked (step 76) and a log entry is made. The log entry includes the relative path name of the object, the ID of the unlocked object, an indicator that an unlock operation has occurred and a timestamp (step 78).

Figure 5:
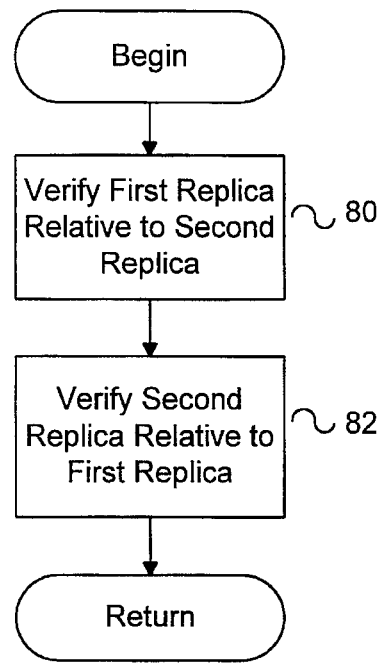
FIG. 5 is a flowchart that provides an overview of the steps performed in verification of replication in accordance with the preferred embodiment of the present invention.

The preferred embodiment of the present invention operates on a replica in an iterative pairwise fashion. In particular, as shown in FIG. 5, the above described steps are first performed to verify objects of the first replica relative to a second replica (step 80). These steps are then applied to verify the second replica relative to the first replica (step 82).

Figure 6:
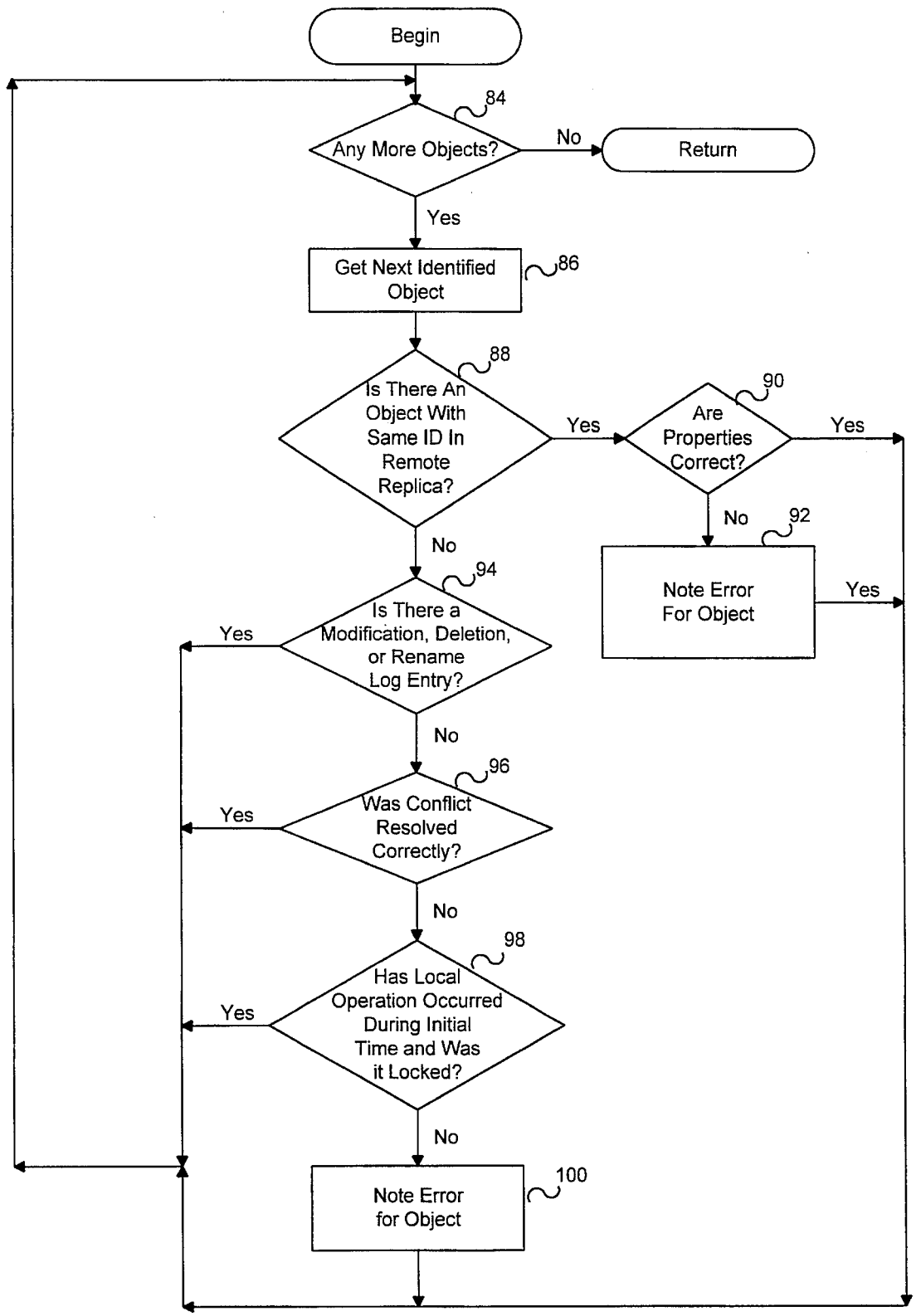
FIG. 6 is a more detailed flowchart showing the steps that are performed during verification of replication in the preferred embodiment of the present invention.

The aim of the verification is to identify objects where errors had arisen. FIG. 6 is a flow chart illustrating the sub-steps performed as part of step 43 of FIG. 2 to realize such identification of objects where errors have arisen. The steps of FIG. 6 are performed separately for steps 80 and 82 of FIG. 5. In other words, the steps of FIG. 6 are performed first looking at a first replica relative to a second replica and then looking at the second replica relative to the first replica.

Initially, a pass is made through the local operations log to determine the set of objects for which the local change object is responsible. In other words, the testing tools 37 look at the IDs in the operations log and determine the objects in the local replica (step 84). The testing tools process each object of the local replica in sequence and initially check whether any objects remain. When no more identified objects remain, the verification is complete. However, if an identified object remains, the next identified object in the local replica is obtained (step 86). A determination is made whether there is an object with the same object ID in the remote replica as the identified object (step 88). Presumably, if replication occurred properly, both replicas contain the same objects, and these objects will have the same properties at each replica. As will be explained below, there may be reasons other than the failure of replication which explain inconsistencies between replicas. If a corresponding object exists in the remote replica, the properties of the object in the remote replica are checked (step 90). The properties are checked, because although the remote replica may contain an object with the same name as the local replica, the properties of the object of the remote replica may still differ. Among the properties checked is the relative path name of the object at the remote replica, the ID of the object at the remote replica and the contents of the object at the remote replica. If the properties are the same, replication has occurred properly for the object. If the properties are not the same, an error is noted (step 92). The steps are then repeated again beginning with step 84.

If in step 88, it is determined that there is not an object with the same ID in the remote replica, the log maintained at the local replica is examined. In particular, the log is examined to determine if there is a modify object, delete object or rename object log entry for the identified object. If a log entry is not found in the local log, the remote log is searched for such log entries (step 94). If there is such a log entry, the above steps are repeated beginning with step 84. The log entries explain the absence of the object; thus, no error has occurred.

On the other hand, if there is not such a log entry, the object is lost as a result of name space conflict, and the conflict resolution rules must be examined. The conflict resolution rules refer to rules that are applied to resolve changed conflicts. These conflict resolution rules are summarized in Table 1.

|  | Destination Create of conflicting name | Destination Delete | Destination Rename/Move To | Destination Rename/Move From |
|---|---|---|---|---|
| Source Create | Conflict. The operation with the later timestamp is the one which survives. | Not a conflict. | Conflict. The operation with the later timestamp is the one which survives. | Not a Conflict. |
| Source Delete | Not a Conflict. | Not a Conflict. | Not a Conflict. | Conflict. The deletion will always win. |
| Source Rename/Move To | Conflict. The operation with the later timestamp is the one which survives. | Not a Conflict. | Conflict (a different object is being moved to that name name). The operation with the later timestamp is the one which survives. | Not a Conflict. |
| Source Rename/Move From | Not a Conflict. | Conflict. The deletion will always win. | Not a Conflict. | Conflict (The same object is being renamed/moved to a different name as on the source). The operation with the later timestamp is the one which survives. |

In step 96, by examining the log and the conflict resolution rules, the testing tool determines whether the name space conflict was appropriately resolved. In other words, it checks whether the conflict rules were properly applied for the situation. If the conflict was appropriately resolved, the verification process may move on to the next identified entry at step 84.

If the conflict was not resolved correctly, a final check is made. Specifically, a check is made whether a local operation on the object has occurred between the last time propagation occurred and the propagation time previous to the last propagation. If such a change occurred, a determination is made whether the object was "locked" at the time of the last propagation (step 98). If the object was locked at the time of the last propagation, then no replication error occurred. On the other hand, if these conditions are not fulfilled in step 88, an error is noted for the object (step 100). The above described steps of FIG. 6 are performed until all of the object IDs of the local replica have been examined. The result is a list of objects for which replication errors occurred.

The result of applying the verification strategy of the preferred embodiment of the present invention is a list of objects, if any, where errors have arisen. This knowledge may be used to correct errors in the replication facility and/or to verify correct operation of an installed replication facility. Such verification is critical in systems that rely heavily on replication.

While the present invention has been described with reference to a preferred embodiment thereof, those skilled in the art will appreciate the various changes and form of detail may be made without departing from the spirit and scope of the present invention as defined in the appended claims.

We claim:

1. In a computer system having a storage with a name space containing logical structures and a multi-master replication facility for replicating said logical structures, a method for verifying proper operation of said replication facility, comprising the computer-implemented steps of:

providing a testing tool for verifying proper operation of said replication facility;

the testing tool making changes to selected ones of said logical structures within the name space at a first location in said computer system;

the testing tool logging information about said changes in a log held in said storage;

the replication facility replicating said selected logical structures to a second location in said computer system; and the testing tool verifying that said changes to said selected logical structures were properly replicated to said second location in said replicating step to verify proper operation of said replication facility by examining the logged information in the log.

2. The method of claim 1 wherein said logical structures comprise files.

3. The method of claim 1 wherein said logical structures comprise directories of files.

4. The method of claim 1 wherein said step of the testing tool making changes comprises the step of deleting one of said logical structures at said first location in response to a request by a deleter logical structure that is one of said logical structures stored in said storage.

5. The method of claim 4 wherein said step of the testing tool logging information about said changes in said log comprises the step of logging an identifier that identifies said deleted logical structure, an identifier that identifies said deleter logical structure and name space information for accessing said deleted logical structure.

6. The method of claim 1 wherein said step of the testing tool making changes comprises the step of creating a logical structure at said first location in response to a request by a creator logical structure which is one of said logical structures stored in said storage.

7. The method of claim 6 wherein said step of the testing tool logging information about said changes in said log comprises the step of logging an identifier that identifies said created logical structure, an identifier that identifies said creator logical structure and name space information for accessing said created logical structure.

8. The method of claim 1 wherein said step of the testing tool making changes comprises the step of modifying one of said logical structures at said first location in response to a request by a modifier logical structure which is one of said logical structures stored in said storage.

9. The method of claim 8 wherein said step of the testing tool modifying one of said logical structures comprises the step of assigning a new identifier to said modified logical structure to identify it.

10. The method of claim 9 wherein said step of the testing tool logging information about said changes in said log comprises the step of logging an identifier that identifies said modified logical structure before it was modified, said new identifier of said modified logical structure, an identifier that identifies said modifier logical structure and name space information for accessing said modified logical structure.

11. The method of claim 1 wherein said step of the testing tool making changes comprises the step of renaming one of said logical structures at said first location in response to a request by a renamer logical structure which is one of said logical structures stored in said storage.

12. The method of claim 11 wherein said step of renaming one of said logical structures comprises the step of assigning a new identifier to said renamed logical structure that identifies it.

13. The method of claim 12 wherein said step of the testing tool logging information about said changes in said log comprises the step of logging an identifier that identifies said renamed logical structure before it was renamed, said new identifier of said renamed logical structure, an identifier that identifies said renamed logical structure, name space information for accessing said renamed logical structure before it was renamed and name space information for accessing said renamed logical structure after it was moved.

14. The method of claim 1 wherein said step of the testing tool making changes comprises the step of moving one of said logical structures to a new location in response to a request by a mover logical structure which is one of the logical structures stored in said storage.

15. The method of claim 14 wherein said step of the testing tool moving one of said logical structures comprises the step of assigning a new identifier to said moved logical structure that identifies it.

16. The method of claim 15 wherein said step of the testing tool logging information about said changes in said log comprises the step of logging an identifier that identifies said moved logical structure before it was moved, said new identifier for said moved logical structure, an identifier that identifies said mover logical structure, name space information for accessing said moved object before it was moved and name space information for accessing said moved object after it was moved.

17. The method of claim 1 wherein said step of the testing tool verifying that said changes to said selected logical structures were properly replicated to said second location in said replicating step comprises the step of determining whether all of said selected logical structures at said first location are present at said second location.

18. The method of claim 1 wherein said step of the testing tool verifying that said changes to said selected logical structures were properly replicated to said second location in said replicating step comprises the step of determining whether all of said replicated selected logical structures at said second location are present at said first location.

19. In a distributed system having a replicator facility and storage devices with an associated name space containing objects, a method of verifying proper operation of said replicator facility, comprising the distributed system-implemented steps of:

providing a testing tool to verify proper operation of said replicator facility;

the testing tool providing a local replica having a set of objects within the name space to be replicated;

the testing tool making at least one change to an object in the local replica in said storage devices and logging information about the at least one change into a log;

the replicator facility replicating said local replica with a remote replica having a corresponding set of objects within the name space to make said remote replica reflect said change made at said local replica; and the testing tool verifying proper replication of said local replica to verify proper operation of the replicator facility by examining the logged information in the log.

20. A data processing system comprising:

a local set of logical structures within a name space of the data processing system;

a remote act of logical structures within the name space;

a multi-master replication facility for replicating logical structures, comprising:

a last writer wins reconciler for reconciling reconcilable sets of logical structures so that later made changes to logical structures are favored over earlier made conflicting changes to said logical structures when reconciling said reconcilable sets of logical structures and so that said reconcilable sets of logical structures are substantially identical; and a replication verifier for verifying that said replication facility operates properly.

21. The data processing system of claim 20 wherein said data processing system is a distributed system.

22. A computer-readable storage medium for use in a computer system having a storage with a name space containing logical structures and a multi-master replication facility for replicating said logical structures, said storage medium holding a testing tool for verifying proper operation of said replication facility by performing the steps of:

the testing tool making changes to selected ones of said logical structures within the name space at a first location in said computer system;

the testing tool logging information about said changes in a log held in said storage;

the multi-master replication facility replicating said selected logical structures to a second location in said computer system; and the testing tool verifying that said changes to said selected logical structures were properly replicated to said second location in said replicating step to verify proper operation of said replication facility by examining the logged information in the log.

23. The computer-readable storage medium of claim 22 wherein said logical structures comprise files.

24. The computer-readable storage medium of claim 22 wherein said logical structures comprise directories of files.

25. The computer-readable storage medium of claim 22 wherein verifying that said changes to said selected logical structures were properly replicated to said second location involves determining whether all of said selected logical structures at said second location are present at said first location.

26. The computer-readable storage medium of claim 22 wherein verifying that said changes to said selected structures were properly replicated to said second location involves determining whether all of said selected logical structures at said first location are present at said second location.

27. In a distributed system having a replicator facility and storage devices with an associated name space containing objects, said objects including a local replica having a set of objects to be replicated, a computer-readable storage medium holding a testing tool for verifying proper operation of said replicator facility by performing the steps of:

the testing tool making at least one change to an object in the local replica within the name space of said storage devices and logging information about the at least one change into a log;

the replication facility replicating said local replica with a remote replica having a corresponding set of objects within the name space to make said remote replica reflect said change made at said local replica; and the testing tool verifying proper replication of said local replica to verify proper operation of the replicator facility by examining the information in the log.

* * * * *

UNITED STATES PATENT AND TRADEMARK OFFICE
CERTIFICATE OF CORRECTION

PATENT NO. : 5,613,079
DATED : March 18, 1997
INVENTOR(S) : Kirt Debique and Balan S. Raman It is certified that error appears in the above-indentified patent and that said Letters Patent is hereby corrected as shown below:

In column 10, claim 20, line 4, following "remote", please delete "act", and insert --set--.

Signed and Sealed this

Twenty-third Day of September, 1997

Attest:

BRUCE LEHMAN

*Attesting Officer*  *Commissioner of Patents and Trademarks*